United States Patent
Ito

(10) Patent No.: US 7,688,957 B2
(45) Date of Patent: Mar. 30, 2010

(54) INFORMATION SERVICE SYSTEM, INFORMATION SERVICE METHOD, AND INFORMATION SERVICE PROGRAM

(75) Inventor: Hayuru Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1063 days.

(21) Appl. No.: 11/350,852

(22) Filed: Feb. 10, 2006

(65) Prior Publication Data

US 2006/0140366 A1  Jun. 29, 2006

Related U.S. Application Data

(63) Continuation of application No. PCT/JP03/11888, filed on Sep. 18, 2003.

(51) Int. Cl.
*H04M 15/00* (2006.01)
*H04M 3/42* (2006.01)

(52) U.S. Cl. ............... 379/114.05; 379/114.03; 379/114.12; 379/218.01

(58) Field of Classification Search ............ 379/114.01, 379/114.03, 114.05, 114.06, 114.09, 114.12, 379/121.01, 121.02, 121.05, 218.01, 218.02
See application file for complete search history.

(56) References Cited

U.S. PATENT DOCUMENTS 5,646,984 A   7/1997  Oda 7,149,294 B2 *  12/2006  O'Donnell ............... 379/114.2

FOREIGN PATENT DOCUMENTS

| JP | 62-284560 | 12/1987 |
| JP | 07-273910 | 10/1995 |
| JP | 09-214642 | 8/1997 |
| JP | 09-284427 | 10/1997 |
| JP | 2002-175471 | 6/2002 |

* cited by examiner

*Primary Examiner*—Binh K Tieu
(74) *Attorney, Agent, or Firm*—Staas & Halsey LLP

(57) ABSTRACT

There is provided an information service system, an information service method, and an information service program, the information service system comprising an interactive system 31 that implements an interactive control apparatus 3103 for providing information or executing processing according to an interactive script in response to a request that has been made by a service user through voice or push button operation; an interactive log management apparatus 32 that manages an interactive log related to the usage of the interactive system 31; and a call charge burden ratio calculation apparatus 33 that calculates the ratio of the burden of call charges associated with the telephone information service between an information service provider and service user based on the interactive log managed by the interactive log management apparatus and call charges information associated with a use of the interactive system.

12 Claims, 3 Drawing Sheets

INFORMATION SERVICE SYSTEM, INFORMATION SERVICE METHOD, AND INFORMATION SERVICE PROGRAM

This is a continuing application, filed under 35 U.S.C. §111(a), of International Application PCT/JP03/11888, filed Sep. 18, 2003, now pending.

BACKGROUND OF THE INVENTION

1. Field of the Invention

The present invention relates to an information service system, an information service method, and information service program for providing an information service using an interactive system constituted by an interactive script and interactive control mechanism.

2. Description of the Related Art

In recent years, an interactive service using a computer automatic answering function has been increased, wherein an information service (hereinafter, referred to as "telephone information service") utilizing a telephone connected to a public network is provided (refer to, for example, Patent Document 1: Jpn. Pat. Appln. Laid-Open Publication No. 2003-69708). Call charge revenue increases with an increase in availability of a telephone information service, so that a telephone service provider that runs a public network and provides a telephone call service usually provides an incentive to a provider that provides a telephone information service (hereinafter, referred to as "telephone information service provider") in accordance with its contribution to the increase in call charge revenue. In order to calculate the incentive based on availability of the telephone information service, the telephone information service provider records and manages data on the availability of the telephone information service.

However, the following problem lies in the abovementioned telephone information service. The business providing the telephone information service is maintained by user's frequent use of this service. However, user's lack of understanding about an operation method, user's lack of an operation skill, or lack of usability in the telephone information service itself may impede a user from acquiring his or her desired information, or from executing desired processing. Further, even if the desired information acquisition or desired processing can be performed, it may take very long time for the user to accomplish it, resulting in higher call charge than expected. As a result, users may move away from the telephone communication service with the result that the number of users that utilize the service or utilization frequency of the service takes a downturn. Thus, there is a possibility that the business providing the telephone information service cannot be maintained.

SUMMARY OF THE INVENTION

The present invention has been made in view of the above points, and an object thereof is to provide an information service while reducing the cost burden on the user.

To solve the above problem, according to a first aspect of the present invention, there is provided an information service system that provides a telephone information service to a service user through a telephone connected to a public line, comprising: an interactive system that implements an interactive control apparatus for providing information or executing processing according to an interactive script in response to a request that has been made by the service user through voice or push button operation; an interactive log management apparatus that manages an interactive log related to the usage of the interactive system; and a call charge burden ratio calculation apparatus that calculates the ratio of the burden of call charges associated with the telephone information service between an information service provider and service user based on the interactive log managed by the interactive log management apparatus and call charges information associated with a use of the interactive system.

In the case where the user has failed to receive his or her desired information service, the call charge burden ratio calculation apparatus adopts a calculation method that reduces the cost burden on the user at a fixed rate.

Further, in the case where the user has failed to receive his or her desired information service, the call charge burden ratio calculation apparatus adopts a calculation method that reduces the cost burden on the user more as the period of time needed to determine that the user has failed to receive desired information service becomes longer.

Further, in the case where the user has received his or her desired information service, the call charge burden ratio calculation apparatus adopts a calculation method that reduces the cost burden on the user at a fixed percentage when the talk time has exceeded the standard time needed for the user to receive the service, which is set by the information service provider.

Further, in the case where the user has received his or her desired information service, the call charge burden ratio calculation apparatus adopts a calculation method that reduces the cost burden on the user more as the talk time that has elapsed after the required standard time for service set by information service provider becomes longer.

Further, in the case where the user has received his or her desired information service, the call charge burden ratio calculation apparatus adopts a calculation method that reduces the cost burden on a fixed percentage of users (accordingly, in this case, the users to which the cost burden reduction is applicable is limited to a fixed percentage of users) at a fixed percentage when the number of users is counted in the descending order in terms of talk time length based on achievement data about information service achievement time of all users that have received the same service content.

Further, in the case where the user has received his or her desired information service, the call charge burden ratio calculation apparatus adopts a calculation method that reduces the more cost burden on the user as the talk time that has elapsed after the required standard time for service set by information service provider becomes longer when the number of users is counted in the descending order in terms of talk time length based on achievement data about information service achievement time of all users that have received the same service content.

Further, the call charge burden ratio calculation apparatus adopts a calculation method that reduces the cost burden on the user based on self-assessment information on whether the service user has received his or her desired information service.

Further, the call charge burden ratio calculation apparatus calculates the cost burden on the user in view of the user's requested cost burden ratio.

Further, the cost burden on the user calculated by the call charge burden ratio calculation apparatus is notified to the service user.

According to a second aspect of the present invention, there is provided an information service method that provides a telephone information service to a service user through a telephone connected to a public line, comprising: an interactive step that provides information or executes processing according to an interactive script in response to a request that has been made by the service user through voice or push button operation; an interactive log management step that manages an interactive log exchanged in the information provision or processing execution; and a call charge burden ratio calculation step that calculates the ratio of the burden of call charges associated with the telephone information service between an information service provider and service user based on the interactive log managed by the interactive log management step and call charges information associated with the request of the information provision or processing execution.

According to a third aspect of the present invention, there is provided an information service program allowing a computer to execute an information service that provides a telephone information service to a service user through a telephone connected to a public line, the program allowing the computer to execute: an interactive step that provides information or executes processing according to an interactive script in response to a request that has been made by the service user through voice or push button operation; an interactive log management step that manages an interactive log exchanged in the information provision or processing execution; and a call charge burden ratio calculation step that calculates the ratio of the burden of call charges associated with the telephone information service between an information service provider and service user based on the interactive log managed by the interactive log management step and call charges information associated with the request of the information provision or processing execution.

According to the present invention, the burden ratio of call charges associated with the telephone information service between the service user and telephone information service provider is calculated based on the interactive log and information related to the call charges associated with the use of the interactive system. With this configuration, it is possible to obtain the information service provision system capable of reducing the cost burden on the user, thereby contributing to the maintenance of the business of the telephone information service provider.

Further, the above information service program can be stored in a computer-readable storage medium. The computer-readable medium mentioned here includes: a portable storage medium such as a CD-ROM, a flexible disk, a DVD disk, a magneto-optical disk, or an IC card; a database that holds computer program; and another computer and database thereof.

DETAILED DESCRIPTION OF THE PREFERRED EMBODIMENTS

Outline of Invention

Figure 1:
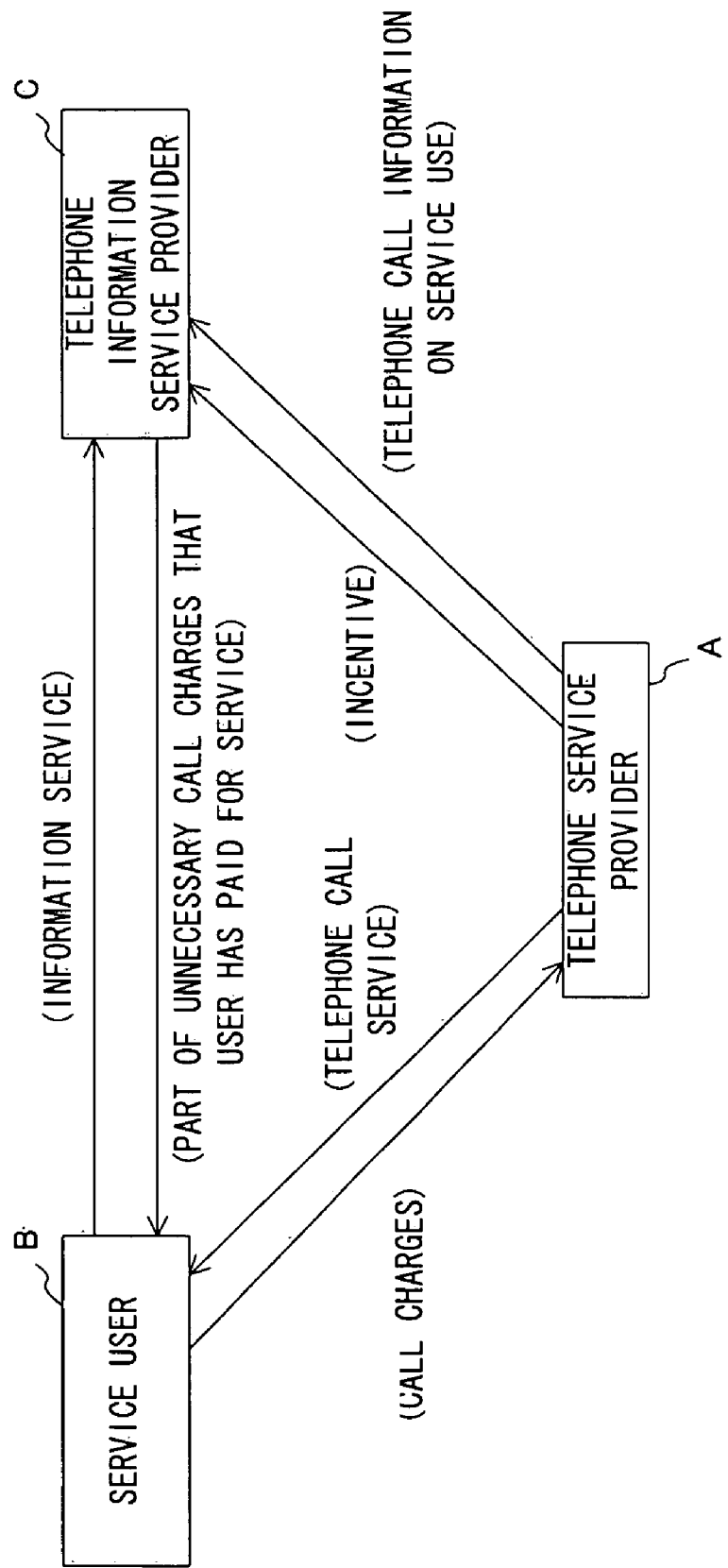
FIG. 1 is a conceptual explanatory view showing a telephone information service business using an information service system according to the present invention.

FIG. 1 is a conceptual explanatory view showing a telephone information service business using an information service system according to the present invention. In the system, a telephone service provider A provides a public network telephone call service, and a service user B pays call charges. A telephone information service provider C provides an information service to the user that uses the telephone information service. More specifically, the telephone information service provider C provides the user's desired information or performs the user's desired processing. In order to access the telephone information service, the user utilizes a telephone call service and, accordingly, call charges that the telephone service provider A receives from the service user B increase. The telephone service provider A therefore provides an incentive to the telephone information service provider C in accordance with an increase in the call charges associated with the telephone information service. With the incentive provided by the telephone service provider A, the telephone information service provider C can provide a service that encourages the user to utilize the telephone information service as well as maintain this service.

However, in the case where the service user B cannot obtain the desired information service contrary to his or her expectation, it means that the user feels that this is an unnecessary payment. If the use of the telephone information service decreases because of the above reason, the incentive that the telephone service provider A provides to the telephone information service provider C is reduced. Accordingly, the telephone information service provider C becomes unable to maintain the business with the result that the telephone information service business falls into bankruptcy. In order to avoid the above situation, the telephone information service provider C utilizes an information service system according to the present invention. In this system, a part of the unnecessary call charges that the user has paid is returned to the user. This system guarantees that service user B need not make an unnecessary payment due to low quality service, preventing the user from moving away from the telephone information service.

Embodiment

Entire Configuration

Figure 2:
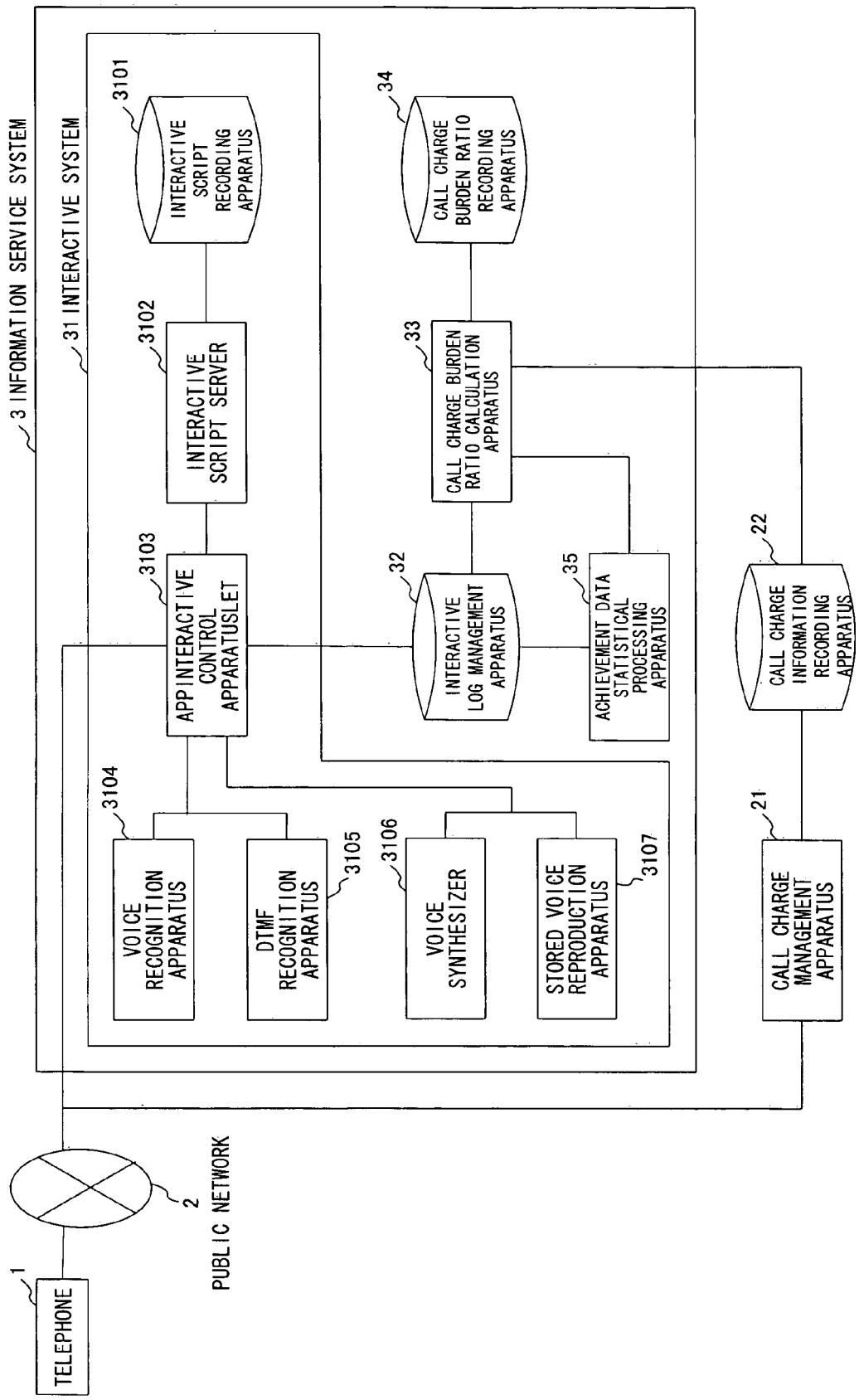
FIG. 2 is the entire configuration of a telephone information service system according to the present invention.

FIG. 2 is the entire configuration of the telephone information service system according to the present invention. The telephone information service system of FIG. 2 includes: a telephone 1 that the service user B uses as communication terminal equipment in order to access the telephone information service; a public network 2 that the telephone service provider A runs; a call charge management apparatus 21 for the telephone service provider A to manage call charges associated with the telephone information service; a call charge information recording apparatus 22 for recording information managed by the call charge management apparatus 21; and an information service system 3 that the telephone information service provider C runs.

The information service system 3 includes: an interactive system 31 that provides an information service to the service user B; an interactive log management apparatus 32 for recording information related to whether information presentation/processing execution that the service user B desires has been achieved by the information service, information service use processes, and the time needed for completing the respective use processes; a call charge burden ratio calculation apparatus 33 that calculates the ratio of the burden of call charges associated with the telephone information service between the service user B and telephone information service provider C based on the information stored in the interactive log management apparatus 32, information managed by the call charge information recording apparatus 22, and achievement data obtained by an achievement data statistical processing apparatus 35 (to be described later); a call charge burden ratio recording apparatus 34 for recording the burden ratio calculated by the call charge burden ratio calculation apparatus 33; and an achievement data statistical processing apparatus 35 that statistically processes (for example, sorts service users in the descending order in terms of the information service achievement time) the information service achievement time of all users.

The interactive system 31 includes: an interactive script recording apparatus 3101 for recording an interactive script describing the procedure of processing an interaction required for the information service; an interactive script server 3102 for supplying the interactive script recorded in the interactive script recording apparatus 3101; an interactive control apparatus 3103 that receives the interactive script through the interactive script server 3102 and provides information or executes processing according to the interactive script in response to a request that has been made by the service user B through voice or push button operation, the interactive control apparatus 3103 implementing a mechanism that performs processing for conducting an interaction and a mechanism for transferring the interaction process and the time needed for completing the process to the interactive log management apparatus 32 as an interactive log; a voice recognition apparatus 3104 that detects information to be input to the interactive system 31 from the voice of the service user B; a DTMF (Dial Tone Multi Frequency) recognition apparatus 3105 that detects information to be input to the interactive system 31 from the push button signal caused by the operation of the service user B; a voice synthesizer 3106 that converts a text prompt that the interactive system 31 issues to the service user B in association with the use of the information service into voice so as to present the voice prompt; and a stored voice reproduction apparatus 3107 that reproduces the stored voice so as to present it to the service user B.

[Processing Performed in Information Service System]

Figure 3:
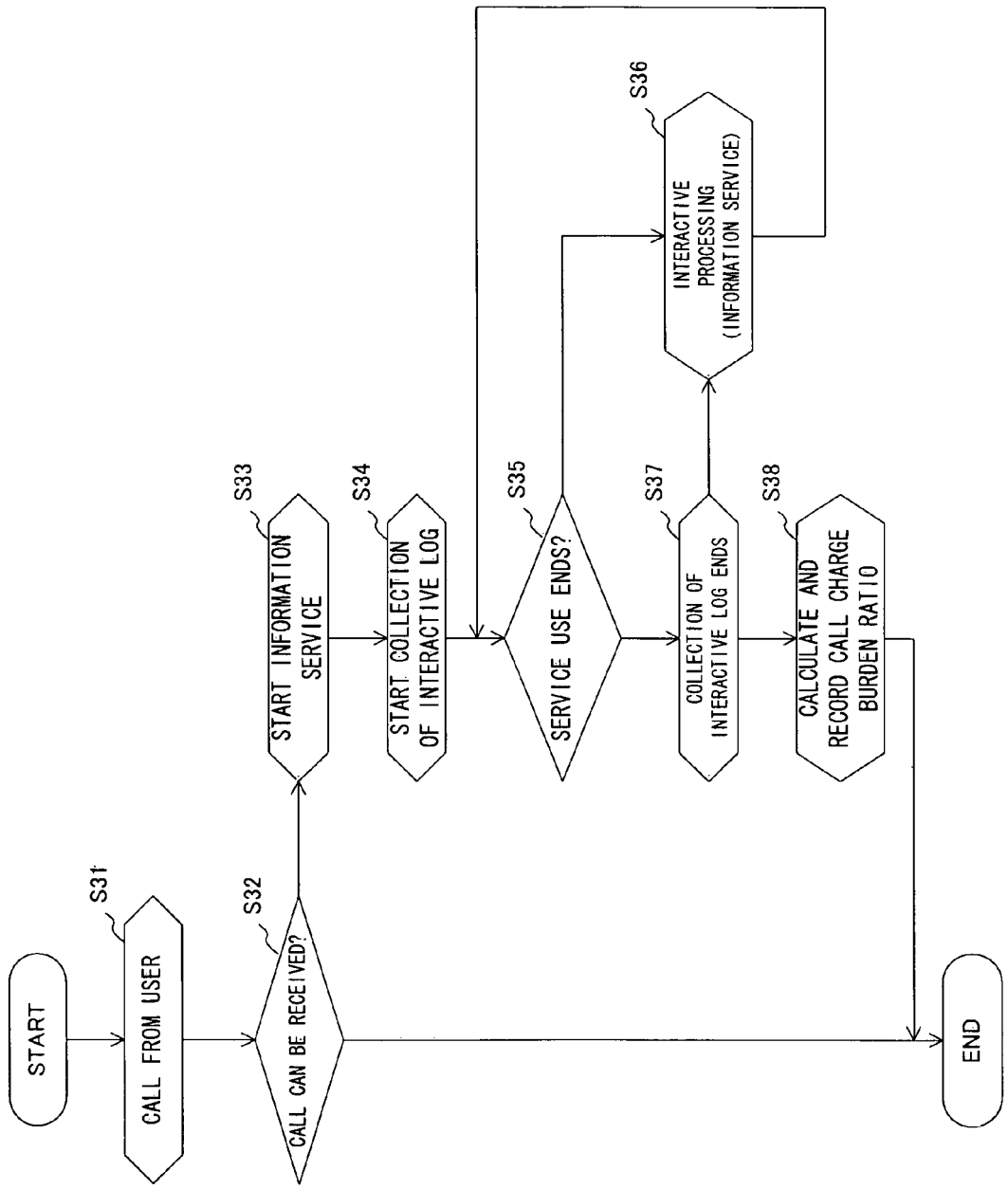
FIG. 3 is the process flow of the information service system shown in FIG. 2.

Next, the processing performed in the information service system 3 will be described with reference to the process flow of the information service system 3 shown in FIG. 3. When utilizing the telephone information service, the service user B calls the information service system 3 (Step S31). The interactive system 31 determines whether it can receive the call or not (Step S32). When determining that the call can be received, the interactive system 31 starts the information service (step S33). When determining that the call cannot be received, the interactive system 31 ends this flow. Upon starting the information service, the interactive system 31 starts collecting an interactive log (Step S34). After step S34, the interactive system 31 determines whether the telephone call has been disconnected, whether the service user B has made a service termination request, or whether processing of the interactive script has been completed (Step S35) and continues the information service according to the interactive processing until any of the connection of the telephone call, service termination request, and completion of the processing of the interactive script has been made (Step S36). When any of the connection of the telephone call, service termination request from the service user B, and completion of the processing of the interactive script has been detected in step S35, the interactive system 31 ends the collection of the interactive log (Step S37). After step S37, the call charge burden ratio calculation apparatus 33 calculates the call charge burden ratio and records a calculation result in the call charge burden ratio recording apparatus 34 (step S38). After step S38, the telephone information service is ended.

By storing the above steps S31 to S38 in a computer-readable storage medium as an information service program, it is possible to allow a computer to execute an information service method.

The call charge burden calculation apparatus 33 can reduce cost burden on the user according the following burden ratio calculation method.

(1) (In the Case where the User has Failed to Receive his or her Desired Information Service)

The cost burden on the user is reduced at a fixed percentage (the amount corresponding to the reduction is paid by the information service provider). In this case, it is assumed that, ratio of cost burden on user (to entire call charge):s (any value less than 100) [%]

(2) (In the Case where the User has Failed to Receive his or her Desired Information Service)

The longer the period of time needed to determine that the user has failed to receive desired information service, the more cost burden on the user is reduced (the amount corresponding to the reduction is paid by the information service provider). In this case, the following calculation method is used:

$$s=b/a \times 100$$

where ratio of cost burden on user (to entire call charge):s[%] entire talk time: a [second]

time needed to determine that user has failed to receive desired information service: b [second].

(3) (In the Case where the User has Received his or her Desired Information Service)

The cost burden on the user is reduced at a fixed percentage (the amount corresponding to the reduction is paid by the information service provider) in the case where the talk time has exceeded the standard time needed for the user to receive the service, which is set by the information service provider. In this case, the following calculation method is used:

Assuming that a≧b, $$s=s'$$

Assuming that a<b, $$s=0$$

where ratio of cost burden on user (to entire call charge):s[%] entire talk time: a [second]

required standard time for service: b [second]

ratio of cost burden on user in the case where talk time has exceeded required standard time for service set by information service provider: s' (any value less than 100) [%]

(4) (In the Case where the User has Received his or her Desired Information Service)

The longer the talk time that has elapsed after the required standard time for service set by information service provider, the more cost burden on the user is reduced (the amount corresponding to the reduction is paid by the information service provider). In this case, the following calculation method is used:

$$s=x \times b/(a-b) \times 100$$

$$x=a-b-((a-b) \times c)/100)$$

assuming that x=<0, s=100
assuming that a=b, s=100 where ratio of cost burden on user (to entire call charge):s[%]

entire talk time: a [second]

standard service achievement time: b [second]

basic cost burden sharing ratio in service (to standard service achievement time): c [%] (c<100)

(5) (In the Case where the User has Received his or her Desired Information Service)

The cost burden on a fixed percentage of users is reduced at a fixed percentage (the amount corresponding to the reduction is paid by the information service provider) in the case where the number of users is counted in the descending order in terms of talk time length based on achievement data about information service achievement time of all users that have received the same service content. In this case, the users to which the cost burden reduction is applicable is limited to a fixed percentage of users according to the descending order of the talk time length based on achievement data about information service achievement time of all users that have received the same service content, and the same calculation method as that of (1) is used.

(6) (In the Case where the User has Received his or her Desired Information Service)

The longer the talk time that has elapsed after the required standard time for service set by information service provider, the more cost burden on the user is reduced (the amount corresponding to the reduction is paid by the information service provider) in the case where the number of users is counted in the descending order in terms of talk time length based on achievement data about information service achievement time of all users that have received the same service content. In this case, the users to which the cost burden reduction is applicable is limited to a fixed percentage of users according to the descending order of the talk time length based on achievement data about information service achievement time of all users that have received the same service content, and the same calculation method as that of (2) is used.

Further, the call charge burden ratio calculation apparatus 33 can adopt a calculation method that reduces the cost burden on the user based on self-assessment information on whether the service user has received his or her desired information service.

Further, the call charge burden ratio calculation apparatus 33 can calculate the cost burden on the service user in view of the user's requested cost burden ratio.

Further, by providing a not-shown communication means, it is possible to notify the user of his or her cost burden that has been calculated by the call charge burden ratio calculation apparatus 33.

As described above, in the information service system according to the above embodiment, a computer of the telephone information service provider that provides the information service utilizing the interactive system constituted by the interactive script and interactive control mechanism is employed. The computer, which implements the interactive script provided by the telephone information service provider and interactive control apparatus that processes the interactive script to conduct an interaction, presents the user a question for receiving a selection of his or her desired information service or a request associated with presentation of information/execution of processing according to the stored interactive script, and presents information or executes processing according to user's request input. The above sequence of processing between the computer and user is performed through a telephone call between telephones connected to a public line provided by the telephone service provider.

Further, the computer records processing process of the interactive control apparatus as an interactive log in the interactive log management apparatus and uses the recorded log and call charges information associated with a use of telephone information service that the telephone service provider manages in the call charge management apparatus to thereby calculate the burden ratio of call charges between the user and telephone information service provider.

Thus, while providing the telephone information service, the interactive control apparatus in the interactive system can record, in an interactive log, information indicating whether information presentation/processing execution that the service user desires has been achieved. Accordingly, the telephone information service provider can determine whether information presentation/processing execution that the service user desires has been achieved by the telephone information service to thereby reflect the determination on the calculation of the burden ratio of call charges.

Further, while providing the telephone information service, the interactive control apparatus in the interactive system can record, in an interactive log, a process other than a regular process (for example, the time that has been used to repeat input operation to the same question from the system) in the course of achieving the user's desired information presentation/processing execution. As a result, the telephone information service provider can recognize unnecessary talk time in the telephone information service to thereby reflect the recognition on the calculation of the burden ratio of call charges.

According to the information service system described in the above embodiment, even in the case where a user cannot acquire his or her desired information, or execute desired processing due to difficulty or inconvenience of the telephone information service, or where, even if the user can, it takes very long time to accomplish it to make the user feel that the he or she has paid unnecessary charges for the information service, the burden ratio of call charges associated with the telephone information service between the user and telephone information service provider is calculated to allow the amount corresponding to the burden on the telephone service provider to be returned to the service user. As a result, the user is guaranteed that he or she need not make an unnecessary payment and this prevents the user from moving away from the telephone information service. Therefore, the telephone information service provider can maintain its business.

As described above, according to the present invention, the burden ratio of call charges associated with the telephone information service between the user and telephone information service provider is calculated based on the interactive log and information related to the call charges associated with the use of the interactive system. With this configuration, it is possible to obtain the information service provision system capable of reducing the cost burden on the user, thereby contributing to the maintenance of the business of the telephone information service provider.

What is claimed is:

1. An information service system that provides a telephone information service to a service user through a telephone connected to a public line, comprising:

an interactive system that implements an interactive control apparatus for providing information or executing processing according to an interactive script in response to a request that has been made by the service user through voice or push button operation;

an interactive log management apparatus that manages an interactive log related to the usage of the interactive system; and a call charge burden ratio calculation apparatus that calculates the ratio of the burden of call charges associated with the telephone information service between an information service provider and service user based on the interactive log managed by the interactive log management apparatus and call charges information associated with a use of the interactive system.

2. The information service system according to claim 1, wherein
in the case where the user has failed to receive his or her desired information service, the call charge burden ratio calculation apparatus adopts a calculation method that reduces the cost burden on the user at a fixed rate.

3. The information service system according to claim 1, wherein
in the case where the user has failed to receive his or her desired information service, the call charge burden ratio calculation apparatus adopts a calculation method that reduces the cost burden on the user more as the period of time needed to determine that the user has failed to receive desired information service becomes longer.

4. The information service system according to claim 1, wherein
in the case where the user has received his or her desired information service, the call charge burden ratio calculation apparatus adopts a calculation method that reduces the cost burden on the user at a fixed percentage when the talk time has exceeded the standard time needed for the user to receive the service, which is set by the information service provider.

5. The information service system according to claim 1, wherein
in the case where the user has received his or her desired information service, the call charge burden ratio calculation apparatus adopts a calculation method that reduces the cost burden on the user more as the talk time that has elapsed after the required standard time for service set by information service provider becomes longer.

6. The information service system according to claim 1, wherein
in the case where the user has received his or her desired information service, the call charge burden ratio calculation apparatus adopts a calculation method that reduces the cost burden on a fixed percentage of users at a fixed percentage when the number of users is counted in the descending order in terms of talk time length based on achievement data about information service achievement time of all users that have received the same service content.

7. The information service system according to claim 1, wherein
in the case where the user has received his or her desired information service, the call charge burden ratio calculation apparatus adopts a calculation method that reduces the more cost burden on the user as the talk time that has elapsed after the required standard time for service set by information service provider becomes longer when the number of users is counted in the descending order in terms of talk time length based on achievement data about information service achievement time of all users that have received the same service content.

8. The information service system according to claim 1, wherein
the call charge burden ratio calculation apparatus adopts a calculation method that reduces the cost burden on the user based on self-assessment information on whether the service user has received his or her desired information service.

9. The information service system according to claim 1, wherein
the call charge burden ratio calculation apparatus calculates the cost burden on the user in view of the user's requested cost burden ratio.

10. The information service system according to claim 1, wherein
the cost burden on the user calculated by the call charge burden ratio calculation apparatus is notified to the service user.

11. An information service method that provides a telephone information service to a service user through a telephone connected to a public line, comprising:
an interactive step that provides information or executes processing according to an interactive script in response to a request that has been made by the service user through voice or push button operation;
an interactive log management step that manages an interactive log exchanged in the information provision or processing execution; and
a call charge burden ratio calculation step that calculates the ratio of the burden of call charges associated with the telephone information service between an information service provider and service user based on the interactive log managed by the interactive log management step and call charges information associated with the request of the information provision or processing execution.

12. A computer readable medium allowing a computer to execute an information service that provides a telephone information service to a service user through a telephone connected to a public line, the program allowing the computer to execute:
an interactive step that provides information or executes processing according to an interactive script in response to a request that has been made by the service user through voice or push button operation;
an interactive log management step that manages an interactive log exchanged in the information provision or processing execution; and
a call charge burden ratio calculation step that calculates the ratio of the burden of call charges associated with the telephone information service between an information service provider and service user based on the interactive log managed by the interactive log management step and call charges information associated with the request of the information provision or processing execution.

* * * * *